Jan. 28, 1964
K. DAVY
3,119,951
OVERCURRENT PROTECTION UNIT FOR ALTERNATING CURRENT MACHINES
Filed May 18, 1961
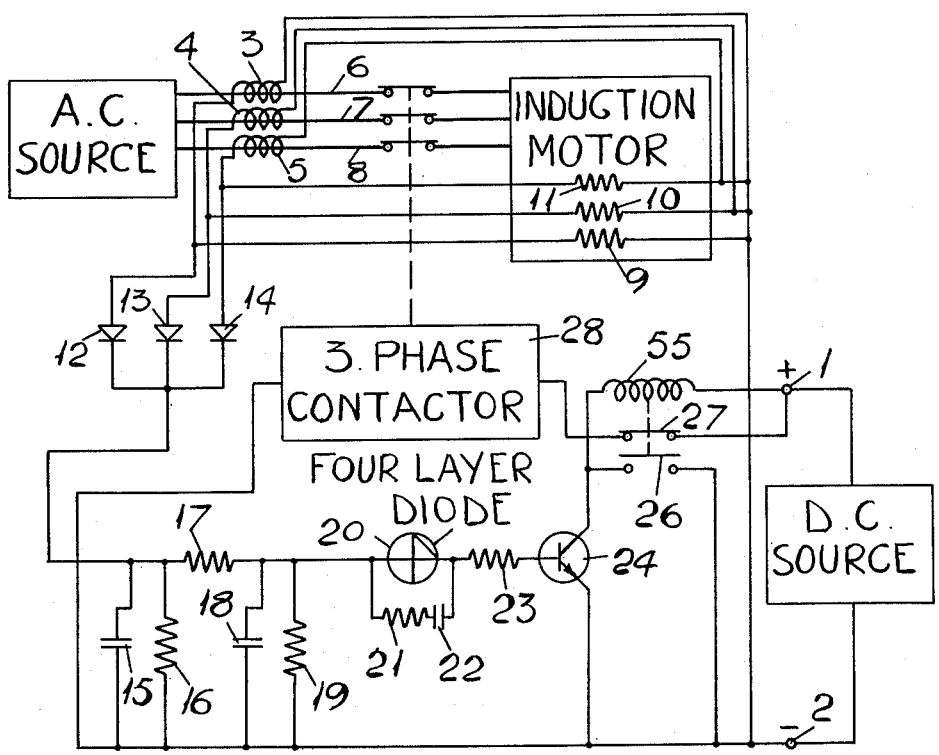

United States Patent Office 3,119,951
Patented Jan. 28, 1964

3,119,951
OVERCURRENT PROTECTION UNIT FOR ALTERNATING CURRENT MACHINES
Kenneth Davy, Hemel Hempstead, England, assignor to Rotax Limited, London, England
Filed May 18, 1961, Ser. No. 111,090
Claims priority, application Great Britain May 20, 1960
3 Claims. (Cl. 317—13)

The object of this invention is to provide in a convenient form a protection unit for use with alternating current machines, and more particularly induction motors, whereby the machine will be isolated in the event of the normal running current becoming too high, but will not be isolated as a result of high currents during starting.

A unit in accordance with the invention comprises in combination a capacitor, means for applying to the capacitor a rectified voltage proportional to the maximum current in the, or a, phase of the machine, a four layer diode or equivalent device adapted to break down when the voltage across it exceeds a predetermined value, and thereafter to continue to conduct until the current flowing through it falls practically to zero, a delay circuit between the capacitor and the device whereby the device is subjected to the voltage across the capacitor only after a predetermined time lag, and a relay operable as a result of current flowing through the device for isolating the machine.

An example of the invention is illustrated diagrammatically in the accompanying drawings as applied to a three-phase inductor motor.

Referring to the drawing there are provided first and second supply terminals 1, 2 adapted for connection to a source of direct or rectified alternating current so that their polarities are positive and negative respectively. The terminal 2 is connected to one of each of three toroidal windings 3, 4, 5 which surround the three phase conductors 6, 7, 8 of the motor respectively and are bridged by three resistors 9, 10, 11. The resistors 9, 10, 11 are connected respectively through three diodes 12, 13, 14 to one side of a first capacitor 15, the other side of which is connected to the terminal 2.

Connected in parallel between said one side of the capacitor and the second terminal are two circuits one of which contains a resistor 16, and the other of which contains a resistor 17 and a capacitor 18. Furthermore, a point between the resistor 17 and the capacitor 18 is connected to the terminal 2 through a resistor 19 and to one side of a four layer diode or equivalent device 20 adapted to break down when the voltage across it exceeds a predetermined value, and thereafter to remain conductive until the current flowing through it falls practically to zero. The device 20 is bridged by a resistor 21 and a capacitor 22, and its other side is connected through a resistor 23 to the base terminal of an NPN type transistor 24 having its emitter terminal connected to the terminal 2 and its collector terminal connected to the terminal 1 through the coil 25 of a relay. The relay has a hold-on contact 26 and in addition a normally closed contact 27 connected between the three-phase contactor 1 and a terminal 28, the arrangement being such that energization of the relay opens the contact 27 and thereby isolates the motor.

In use a voltage is developed across each of the resistors 9, 10, 11 as a result of current flow in the phases 6, 7, 8 of the motor. This voltage is rectified and applied to the capacitor 15, so that the voltage across this capacitor will be proportional to the maximum current in any phase of the motor. The voltage across the capacitor 15 is fed to the device 20 through a delay circuit consisting of the resistors 17, 19 and the capacitor 18, the arrangement being such that the time taken for the voltage to be applied to the device is longer than the time during which high currents flow when starting the motor.

If, after the time lag, the voltage across the capacitor 18 exceeds the breakdown voltage of the device 20, the capacitor 18 discharges through the device 20 and the resistor 23 to render the transistor 24 conductive. The relay is thus energized and the motor isolated, the relay remaining energized until the supply voltage is switched off.

The purpose of the capacitor 22 is to prevent breakdown of the device 20 by transient voltages, the resistor 21 being provided to protect the device after breakdown.

With apparatus as above described the magnitude of current in a phase at which the apparatus becomes effective will depend on the values of the resistors 9, 10, 11. Thus by fitting the apparatus on the motor and employing resistors 9, 10, 11 with a high temperature coefficient an added protection against excessive temperature rise can be obtained. A disadvantage of such a construction, however, is that with the windings 3, 4, 5 adjacent the motor no protection would be afforded to the parts of the phases of the motor between the windings and the source of supply. In order to overcome this disadvantage, the resistors are housed within the casing of the motor, and the windings surround the phases at a position adjacent to the source of supply.

Although an example of the invention has been described in the application to a three-phase induction motor, it will be understood that the invention is equally applicable to other alternating current machines.

Having thus described my invention what I claim as new and desire to secure by Letters Patent is:

1. A protection circuit for use with a multi-phase A.C. system having an A.C. source, an A.C. machine and a plurality of phase lines connecting the A.C. source to the A.C. machine, said protection circuit comprising a plurality of toroidal windings surrounding the phase lines of the system adjacent the A.C. source, a plurality of resistors connected across the windings respectively, said resistors being housed within a casing of said A.C. machine, a capacitor having one side thereof connected to one end of each resistor, a plurality of diodes through which the other side of the capacitor is connected to the other ends of the plurality of resistors, a delay circuit connected across the capacitor, an operating circuit connected across the delay circuit and including a device which breaks down when the voltage across it exceeds a predetermined value and thereafter continues to conduct until the current flowing through it falls practically to zero, and means operable by current flow in the operating circuit when said device breaks down for isolating said A.C. machine.

2. A protection circuit as claimed in claim 1 including a transistor having its base and emitter in said operating circuit, a D.C. source, and a relay connected in series with the D.C. source and the collector and emitter of said transistor for isolating the A.C. machine.

3. A protection circuit as claimed in claim 1 in which said device is a four layer diode, the protection circuit further including a resistor and a capacitor connected in series across the four-layer diode.

References Cited in the file of this patent
UNITED STATES PATENTS

| | | |
|---|---|---|
| 1,871,787 | Goldsborough | Aug. 16, 1932 |
| 2,440,108 | Maxwell | Apr. 20, 1948 |
| 2,914,702 | Diebold | Nov. 24, 1959 |